US012769451B2

(12) United States Patent
Mathews et al.

(10) Patent No.: US 12,769,451 B2
(45) Date of Patent: Oct. 20, 2026

(54) MEMORY TRANSACTION TIMING COMPENSATION

(71) Applicant: Apple Inc., Cupertino, CA (US)

(72) Inventors: Gregory S. Mathews, Saratoga, CA (US); Lakshmi Narasimha Murthy Nukala, Pleasanton, CA (US); Rakesh L. Notani, Santa Clara, CA (US); Shane J. Keil, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 19/078,650

(22) Filed: Mar. 13, 2025

(65) Prior Publication Data

US 2026/0277444 A1 Sep. 17, 2026

(51) Int. Cl.
*G06F 3/06* (2006.01)

(52) U.S. Cl.
CPC .......... *G06F 3/0613* (2013.01); *G06F 3/0659* (2013.01); *G06F 3/0673* (2013.01)

(58) Field of Classification Search
CPC .... G06F 3/0673; G06F 3/0613; G06F 3/0659; G06F 3/061; G06F 12/0246
USPC ......... 711/154, E12.001, 103, 167, 100, 163
See application file for complete search history.

(56) References Cited

U.S. PATENT DOCUMENTS 6,088,774 A * 7/2000 Gillingham .......... G11C 7/1066 365/194
6,199,133 B1 * 3/2001 Schnell .................. H04L 41/24 710/110
7,352,641 B1 4/2008 Wu
8,730,603 B2 5/2014 Lu et al.
8,977,810 B2 3/2015 Chiu et al.
(Continued)

FOREIGN PATENT DOCUMENTS

CN 101788963 A 7/2010
CN 110764715 B 7/2021
(Continued)

OTHER PUBLICATIONS

U.S. Appl. No. 19/078,587, Ex parte Quayle Action dated Apr. 9, 2026.
(Continued)

*Primary Examiner* — Jared I Rutz
*Assistant Examiner* — Edward Waddy, Jr.
(74) *Attorney, Agent, or Firm* — DICKINSON WRIGHT RLLP

(57) ABSTRACT

A memory subsystem with timing compensation for bandwidth recovery is disclosed. The memory subsystem includes a memory having and a memory controller coupled thereto via a memory bus. The memory controller is configured perform a write transaction that includes writing data to the memory circuit during ones of a plurality of write slots and determine, while performing the write transaction and based on an operating frequency of the memory bus, a number of idle write slots of the plurality of write slot during which data is not written to the memory. The memory controller is further configured to add a number of read slots corresponding to the number of idle write slots to a total number of read slots for a read transaction, and perform, upon completing the write transaction, a read transaction that includes reading data from the memory circuit during the total number of read slots.

20 Claims, 11 Drawing Sheets

(56) References Cited

U.S. PATENT DOCUMENTS

| | | | |
|---|---|---|---|
| 9,514,799 | B2 | 12/2016 | Wang et al. |
| 9,619,316 | B2 | 4/2017 | Bains |
| 9,646,656 | B2 | 5/2017 | Gupta |
| 10,310,997 | B2 | 6/2019 | Farahani et al. |
| 10,838,884 | B1 | 11/2020 | Vijavaraj et al. |
| 11,010,114 | B2 | 5/2021 | Nakamura et al. |
| 11,221,798 | B2 | 1/2022 | Mathews et al. |
| 11,372,544 | B2 | 6/2022 | Kumar et al. |
| 11,455,107 | B2 | 9/2022 | Rajgopal et al. |
| 11,520,731 | B1 | 12/2022 | Diamant et al. |
| 11,782,640 | B2 | 10/2023 | Shen et al. |
| 11,842,056 | B2 | 12/2023 | Kachmar et al. |
| 12,147,286 | B2 | 11/2024 | Mukker |
| 12,164,774 | B2 | 12/2024 | Cresci et al. |
| 2002/0191678 | A1 | 12/2002 | Batra et al. |
| 2010/0110813 | A1 | 5/2010 | Wilson et al. |
| 2010/0293343 | A1 | 11/2010 | Perego |
| 2015/0019801 | A1 | 1/2015 | Yoon et al. |
| 2015/0067249 | A1 | 3/2015 | Wang et al. |
| 2018/0329853 | A1 | 11/2018 | Vijayrao et al. |
| 2019/0317697 | A1 | 10/2019 | La Fratta et al. |
| 2022/0392519 | A1 | 12/2022 | Osborne et al. |
| 2023/0094148 | A1 | 3/2023 | Lee et al. |
| 2023/0104845 | A1 | 4/2023 | Ray et al. |
| 2024/0345771 | A1 | 10/2024 | Park |
| 2024/0370175 | A1 | 11/2024 | Tiku et al. |

FOREIGN PATENT DOCUMENTS

| | | | |
|---|---|---|---|
| CN | 113296684 | A | 8/2021 |
| CN | 111968684 | B | 9/2022 |
| CN | 115357377 | A | 11/2022 |
| CN | 111949100 | B | 2/2023 |
| CN | 118192889 | A | 6/2024 |
| CN | 118366504 | A | 7/2024 |
| CN | 111124317 | B | 11/2024 |
| JP | 2010146252 | A | 7/2010 |
| JP | 7348783 | A | 9/2023 |
| KR | 102613979 | A | 12/2023 |
| WO | 2018216081 | A1 | 11/2018 |

OTHER PUBLICATIONS

U.S. Appl. No. 19/084,161, Notice of Allowance Action dated Aug. 17, 2026.

* cited by examiner

MEMORY TRANSACTION TIMING COMPENSATION

FIELD

This disclosure is directed the memory subsystems, and more particularly, mechanisms for controlling the efficiency of memory bandwidth usage.

BACKGROUND

Modern computing systems operate in various performance states. A given performance state may be based on a clock frequency. Higher performance states correspond to higher clock frequencies. At the higher clock frequencies, a processor may conduct more operations in a given amount of time, and may further perform more memory accesses (reads and/or writes) in the given amount of time.

Many memory systems comprise a number of memory banks, and may further comprise multiple ranks of memory.

At higher performance states, efficiency may be lost if the number of beats of data that are transferred for a particular size memory write, multiplied by the number of memory banks, is less than the number of cycles require to start a new transaction to the initial memory bank to which data was written.

DETAILED DESCRIPTION

Figure 1A:
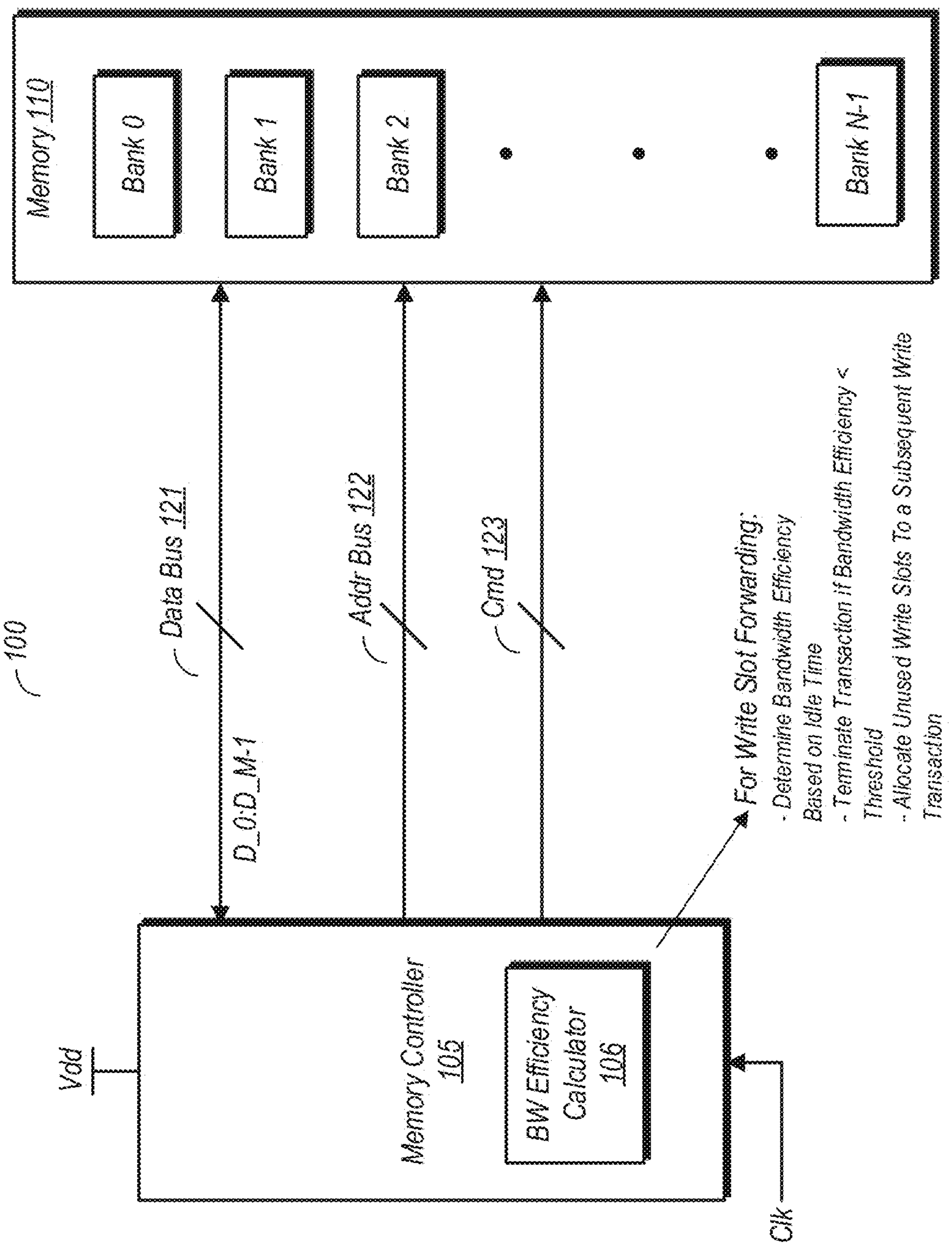
FIG. 1A is a block diagram depicting one embodiment of a memory subsystem.

Modern computing systems may operate in a number of different performance states to optimize performance per unit of power consumed. A performance state is defined by an operating (clock) frequency, and may further be defined by a supply voltage. Higher performance states, to meet higher performance demands, may correspond to higher clock frequencies. The different performance states may be applied to all areas of a computing system, including a memory subsystem that includes a memory controller circuit and a memory circuit.

At higher performance states, various computing workloads may result in a greater number of memory accesses, both in terms of memory reads and memory writes. Both write and read transactions in memory subsystems may be conducted in slots, where a slot comprises an access to a given portion (e.g., a bank) of memory during at least one corresponding clock cycle. A slot may be the number of memory controller clock cycles it takes to transfer a fixed amount of data (example: 64 bytes) to or from the memory. More generally, a slot is defined herein as a unit of time (a time slot) in which a transaction is conducted with a particular portion of the memory. The unit of time may be measured in a number of clock cycles, e.g., 1 clock cycle, 2 clock cycles, etc. Write slots are defined herein as slots associated with a write transaction, while read slots are defined as slots associated with a read transaction. For example, for a write transaction, a write slot may be associated with a write of data to a particular bank of memory, with the write transaction comprising a plurality of write slots. Similarly, for a read transaction, particular read slot may be associated with a read of data from a particular bank of memory, with the read transaction comprising a plurality of read slots. An idle slot in a transaction may be a portion of a transaction where data is neither read from nor written to the memory. Idle slots may be inserted into read transactions and write transactions, as is further discussed below. The duration of a single slot may correspond to a current operating frequency of the clock signal (Clk) received by memory controller 105, with higher frequencies corresponding to shorter duration slots (in terms of time). Thus, even if a slot in a given implementation comprises, e.g., 4 clock cycles, the actual duration of the slot may be shorter at higher frequencies when each clock signal consumes less time.

At higher clock frequencies, there can be memory bandwidth efficiency losses due to various timing parameters for the memory subsystem. One such parameter is the time consumed in turning around a memory bus from a write operation to a read operation, which may be referred to as tWTR. This time is provided to allow for activation and deactivations of the appropriate drivers for read and write transactions, respectively, and is independent of clock frequency. Accordingly, when transitioning from a write transaction to a read transaction, the number of clock cycles elapsed during tWTR is greater at high frequencies relative to the number elapsed at lower frequencies.

Another timing parameter that can affect memory bandwidth efficiency is the amount of time elapsed before a given bank can be reactivated again following a previous access, which may be referred to as nWR. For example, if write transaction requires two write iterations to each of 16 banks, after data has been written to a first bank in a first write slot, a subsequent write to the first bank is performed only after the nWR parameter has been satisfied. This may have no effect at lower frequencies, as the specified nWR may elapse prior to having completed writing to all 16 banks after the first write iteration. However, at higher frequencies, the completion of the first iteration of writing to the 16 banks may occur before nWR has fully elapsed. Accordingly, there can be idle time, and thus idle write slots, before the next iteration of writing to the banks can begin. These idle slots directly result in lost memory bandwidth efficiency.

The present disclosure provides various mechanisms to recover bandwidth efficiency that would otherwise be lost as described above. In various embodiments, a memory controller in accordance with the disclosure includes a bandwidth efficiency calculation circuit to determine a bandwidth efficiency for at least some operating frequencies/performance states and to compare the calculated efficiency to a threshold value. Various actions may be taken to recover memory bandwidth that might otherwise be lost at high frequencies. One mechanism is referred to herein as write slot forwarding in which idle write slots from one transaction (or group of transactions) are forwarded (re-allocated) to a subsequent write transaction (or group of write transactions), and may also include early termination of the write transaction and beginning a read transaction (or group of read transactions). Another mechanism involves allocating idle write slots as read slots to a subsequent read transaction (or group of read transactions) upon completion of a write transaction (or group of write transactions) in order to achieve a desired target efficiency number (TEN) based on the amount of real work vs. real work plus idle slots during a read-plus-write sequence or turn. The target efficiency number may specify a certain number of slots for a write transaction (or group thereof) and a read transaction (or group thereof) that follows. Adding a number of read slots that is equivalent to the number of idle write slots to the following read transaction (or group thereof) may prevent the read transaction(s) from being penalized with fewer real-work slots within the framework specified by the target efficiency number.

Some embodiments of a memory subsystem as disclosed herein are multi-rank (e.g., dual-rank) memory subsystems. A rank as defined herein is a separate and distinct memory that shares a bus with another rank/memory. Accordingly, a dual-rank memory per this definition includes two distinct memories that share the same memory bus, with only one rank/memory accessible at a given time. In a multi-rank memory subsystem, memory bandwidth recovery may be carried out by switching to another rank when the efficiency for carrying out a given transaction is below a threshold. In particular, if a given write transaction has a number of idle slots that causes it to fall below target threshold, the transaction may be terminated early (e.g., during the portion occupied by idle slots) and another write transaction may be initiated on a different rank.

Details of these mechanisms are now discussed in further detail. The discussion begins with descriptions of memory subsystems that are capable of carrying out the different mechanisms described above. Thereafter, description is given of a graphic illustration of the various factors used to determine bandwidth efficiency, followed by a description of a memory subsystem in context of a power management circuit that can control performance states for a computing system that implements the memory subsystem. Methods of carrying out the various bandwidth efficiency mechanisms are then discussed. The disclosure concludes with discussion of a device and a system in which the mechanisms of the disclosure may be implemented, along with a computer-readable medium.

Memory Subsystems with Bandwidth Efficiency Recovery:

FIG. 1A is a block diagram depicting one embodiment of a memory subsystem. In the embodiment shown, memory subsystem 100 includes a memory controller 105 that is coupled to a memory 110 via a data bus 121, an address bus 122, and a command bus 123. The data bus 121 in the embodiment shown is an M-bit data bus configured to convey bits D0:D_M−1 between memory controller 105 and memory 110. Memory 110 in the embodiment shown is an N-bank memory including banks 0, 1, 2, etc., to bank N−1.

Transactions between memory controller 105 and memory 110 may be conducted in slots. A write transaction may a number of slots, and each slot may consume one clock cycle. In the multi-bank memory 110 shown in FIG. 1A, a write transaction may include N slots, with each slot including a write to one of the banks. Furthermore, write transactions may be arranged such that the writes may occur in sequence, beginning with Bank 0. Write transactions may include one or more iterations as well. For a single iteration, a write transaction may include N slots, with writes of data Bank 0 and continuing in sequence to Bank N−1. The number of iterations is dependent on the data size per write transaction. For example, if a given iteration can write 64 bytes of data, a write of 128 bytes of data includes two iterations.

Since each write slot is performed in one clock cycle, at higher frequencies, more slots can be carried out in a given period of time. However, per the discussion above, the values of tWTR (time to turn the memory bus around from a write transaction to a read transaction) and nWR (time elapsed before a given bank can be written to again) are frequency independent. Thus, as higher frequencies, when a given write iteration may be completed in a shorter amount of time, idle write slots may be present in some write transactions.

Memory controller 105 in the embodiment shown includes a circuit designated here as bandwidth efficiency calculator 106, which may calculate a bandwidth efficiency and compare that value to a threshold. This may be performed on a transaction-by-transaction basis. For a given write transaction, if the determined bandwidth efficiency is above the threshold value, no actions are taken other than to allow the transaction to fully complete, including any idle write slots resulting from, e.g., the nWR parameter.

In one embodiment, bandwidth efficiency calculator 106 may calculate the bandwidth efficiency by determining a difference between the time needed to complete the allocated number of time slots and the amount of idle time until the initial bank written to becomes accessible again, and dividing this difference by the time to complete the allocated number of write slots. This efficiency may then be compared to a threshold value. If the efficiency is greater than or equal to the threshold value, the write transaction, including idle slots, may be allowed to complete as scheduled. This may include absorbing the delay of any idle write slots that occur until the initial bank written is once again due to nWR, resuming and completing the transaction thereafter.

However, if the efficiency is less than the threshold, the write transaction may be terminated early, while additional write slots are allocated to a subsequent write transaction. The number of additional write slots allocated to the subsequent write transaction is equal to the number of idle slots in the now-terminated transaction. In one embodiment, after terminating the write transaction, memory controller 105 may initiate a read transaction, with the additional write slots allocated to the next write transaction.

Figure 1B:
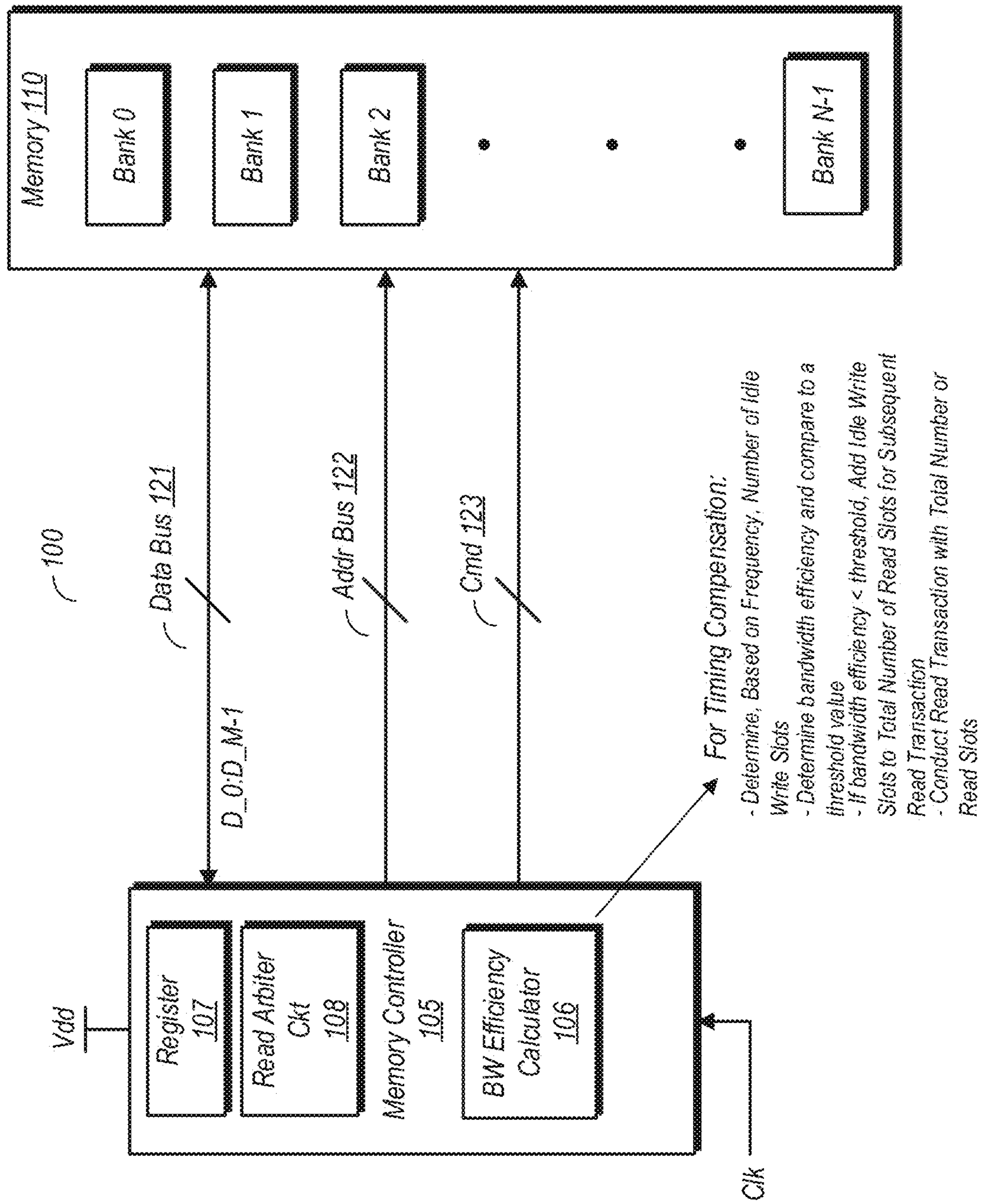
FIG. 1B is a block diagram depicting another embodiment of a memory subsystem.

FIG. 1B is a block diagram depicting another embodiment of a memory subsystem. In the embodiment shown, memory controller 105 includes, in addition to bandwidth calculator 106, a register 107 and a read arbiter circuit 108.

Memory controller 105 is configured to perform both read and write transactions with memory 110, with the transactions being carried out in slots, as described above. Memory controller 105 may further operate in a number of different performance states, including different clock frequencies, to satisfy various computing workloads. Memory controller 105 is further configured to re-allocate idle write slots in certain situations in order to recover or maintain bandwidth efficiency at or above a desired level.

Bandwidth efficiency calculator 106 in the embodiment shown may determine, based on a current operating frequency, a number of idle slots (e.g., due to nWR) in a given write transaction. For some lower frequencies, the number of idle slots will be zero, as the time to nWR will elapse before the write transaction has completed. However, at higher frequencies, writes to all banks in an iteration of a write transaction may complete prior to the elapsing of the time to nWR. In this embodiment, register 107 may store a number of different values corresponding to numbers of idle write slots occurring for write transactions at different frequencies. Accordingly, when performing a write transaction while operating at a particular frequency, register 107 may be accessed to determine the number of idle write slots for that particular frequency. Concurrently, read arbiter circuit 108 may arbitrate between different read requests and determine a next read request to be granted upon completing the write transaction. The number of idle write slots, as read from register 107, may then be added to a number of initially allocated read slots for a new total number of read slots for the selected read transaction. After completing the write transaction, the read transaction may be carried out using the total number of read slots, including those added.

The addition of extra slots to the read transaction may prevent the read transaction from paying a penalty due to idle slots in the write transaction. As noted above, memory controller 105 may operate with a target efficiency number specifying a target efficiency for various memory transactions, including read transactions performed following write transaction. This efficiency metric may be determined, in one embodiment, by dividing the number of non-idle slots by the sum of idle and non-idle slots. However, left uncompensated, the idle write slots can reduce the number of available read slots for a read transaction following a write transaction. This can adversely affect system performance, for example, quality of service (QoS) guarantees for reads. Accordingly, the calculation can be compensated by increasing the total number of slots and adding read slots to the read transaction such that it has enough slots to complete in its entirety while still meeting target efficiency.

In one embodiment, this may be carried out by read arbiter circuit 108. During uncompensated operations, during a write transaction, read arbiter circuit 108 may begin decrementing the total number of slots for a read transaction once the tWTR parameter has been satisfied. This decrementing reduces the number of slots available for the read transaction within the specified target efficiency number. This may not be an issue at lower frequencies, but at higher frequencies, when all write slots are completed prior to nWR, idle slots result. However, per the description above, the number of idle slots may be added by read arbiter circuit 108 to the total number of slots to be part of the next read transaction that wins arbitration. As a result, the read transaction will have enough slots to fully complete, which may reduce or eliminate any undesired effect on QoS targets.

As noted above, the number of idle write slots due to nWR may depend on an operating frequency. At some lower operating frequencies, there may be no idle write slots, and thus no slots are added to the total number of read slots. At some higher frequencies, idle write slots may be present, and this number may increase as the operating frequency increases. For example, at a first operating frequency, a first number of idle slots may be present, while, at a second, higher frequency, a second, higher number of idle slots may be present. Thus, the number of slots added to the total number of read slots is at least partially frequency dependent.

Figure 1C:
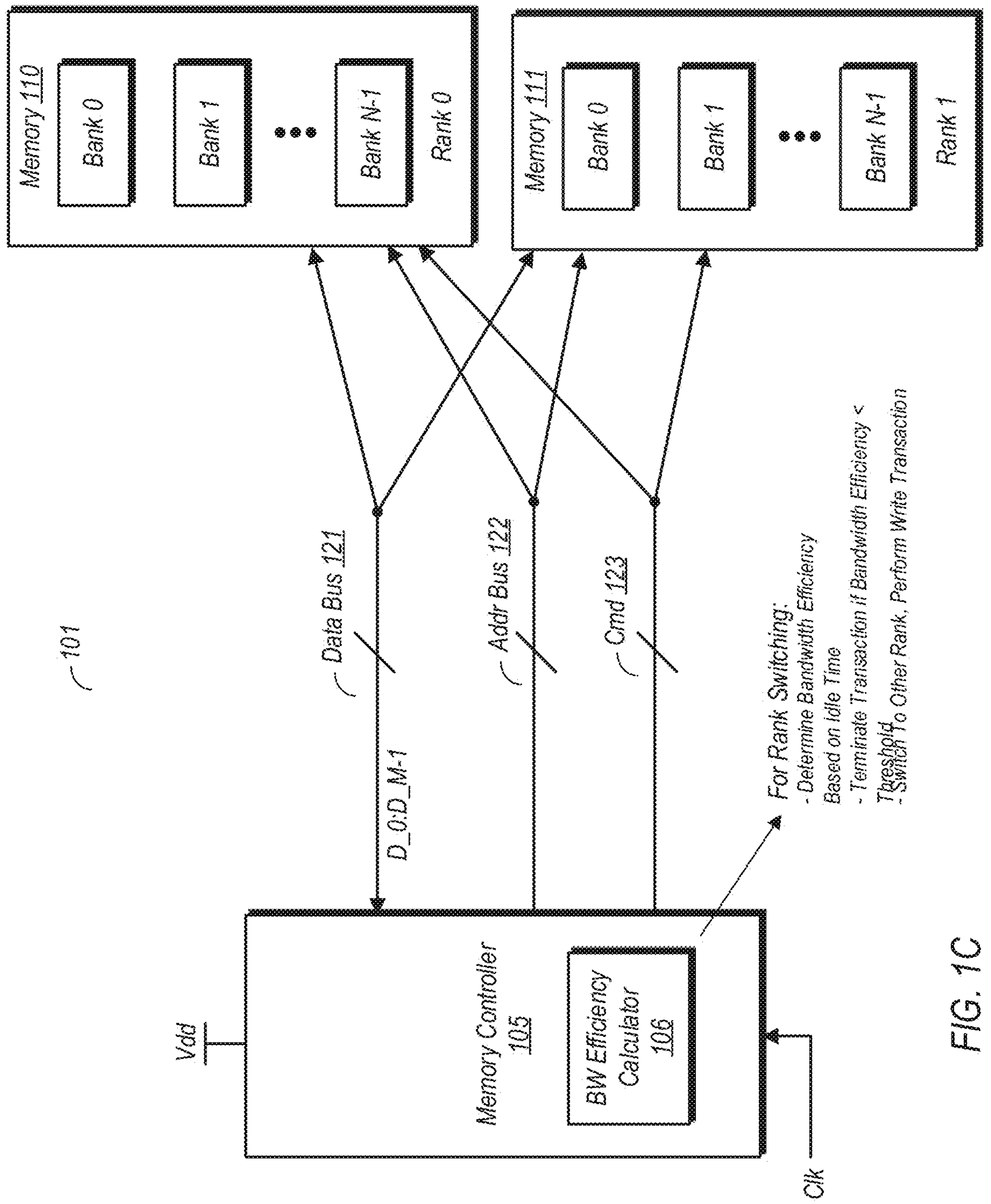
FIG. 1C is a block diagram depicting another embodiment of a memory subsystem.

FIG. 1C is a block diagram depicting another embodiment of a memory subsystem. In this embodiment, memory subsystem 101 is a dual-rank memory subsystem. It is noted that dual-rank memory subsystem 101 is shown here by way of example, although the discussion may extend more generally to any multi-rank memory subsystem.

As shown here, memory subsystem 101 includes memory 110 (Rank 0) and memory 111 (Rank 1). Both memory 110 and memory 111 share a common data bus 121, address bus 122, and command bus 123. Memory controller 105, via command bus 123, may access one of memory 110 or memory 111 at a given time for performing transactions therewith. Memory controller 105 also includes a bandwidth efficiency calculator 106 which may, for a given write transaction, determine an amount of idle time (in terms of actual time or in terms of a number of idle write slots), if any. Using the idle time, bandwidth efficiency calculator may determine the memory bandwidth efficiency and compare the same to a threshold value.

In the event that the bandwidth efficiency is less than the threshold, memory controller 105 may continue performing write transactions by rank switching. Take, for example, a situation in which memory controller 105 is conducting a write to memory 110. If the calculated bandwidth efficiency is less than the threshold, then, after completing all non-idle write slots, memory controller 105 may terminate the write transaction to memory 110 (thereby making moot any remaining idle slots) and initiating another write transaction to memory 111. In this manner, memory controller 105 can switch between ranks to maintain memory bandwidth efficiency without concern for the nWR parameter for the rank of the next write transaction.

The disclosure further contemplates that unused write slots from the write transaction to the first memory may be forwarded to the write transaction to the second memory.

It is noted in some instances, another write transaction, either to the same rank or another rank in a multi-rank memory subsystem, may not be pending when the bandwidth efficiency is determined to be below threshold during a current write transaction. In such instances, memory controller 105 may then initiate a read transaction upon completion of the write transaction, and may add slots to the read transaction per the discussion above.

Figure 2:
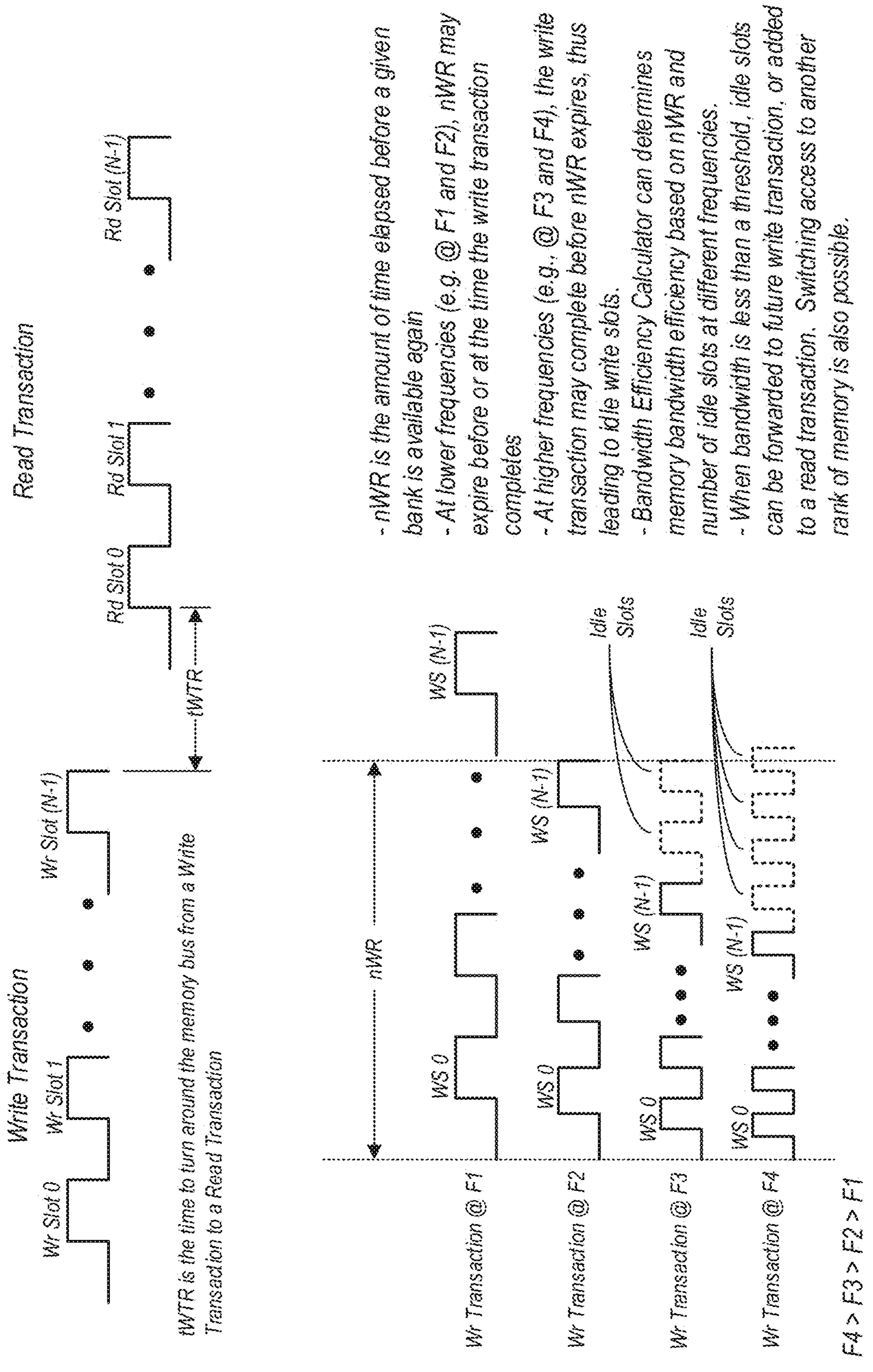
FIG. 2 is a diagram illustrating factor upon which an embodiment of a memory controller calculates bandwidth efficiency.

Bandwidth Efficiency Factors:

FIG. 2 is a diagram illustrating factors upon which an embodiment of a memory controller calculates bandwidth efficiency. As previously noted, two timing parameters can have an impact on the bandwidth efficiency. The first of these is the tWTR parameter, as shown in the upper portion of the drawing. This parameter defines the time to turn around the memory bus (e.g., data bus) when transitioning from a write transaction to a read transaction. In situations where idle write slots are present with a pending read transaction to follow, a read arbiter may begin decrementing a total number of slots to do for the read transaction with each idle slot. This number may increase as frequency increases and in light of the nWR parameter. However, as noted above, the number of idle slots may be added back to avoid penalizing the read transaction, with a corresponding increase in the target efficiency number.

The parameter nWR and how it relates to idle slots is shown in the lower portion of the drawing. Four different examples, each corresponding to a different operating frequency is shown. Each of the examples relates to a write transaction having N write slots, beginning with a first write slot, WS 0, and concluding with a final write slot, WS (N−1).

At the lowest frequency F1, the last slot of the write transaction, WS (N−1) occurs after the nWR time has elapsed. Accordingly, the first bank (written to during WS 0) may be reactivated without delay. Accordingly, at this frequency, there are no idle slots, and a subsequent transaction, write or read, may be initiated without any delay due to waiting for the nWR time to elapse. At the second frequency, F2, the completion of the final write slot WS (N−1) coincides with the elapsing of the nWR time. Thus, as with operations at F1, the next transaction may begin without any additional delay due to nWR.

At the third frequency, F3, the final write slot WS (N−1) occurs prior to elapsing of the nWR time, resulting in two idle slots. Thus, after completion of the final write slot, there is a delay in time equivalent to two write slots until the first bank written to (on WS 0) can be reactivated. At the fourth frequency, there are three full idle write slots, with the nWR time expiring during a fourth idle write slot. Accordingly, no subsequent transaction may be conducted with the memory until after the four idle write slots.

Therefore, at both F3 and F4, at least some write bandwidth is wasted due to waiting for the nWR time to expire. However, as noted above, various mechanisms are provided herein in order to recover at least some of the lost bandwidth. These mechanisms include the write slot forwarding discussed in reference to FIG. 1A, the adding of a number of idle write slots to the number of read slots for a subsequent read transaction. Switching to a different rank for another write transaction instead of waiting for the nWR time to expire for the current rank is also possible. It is noted that various ones of these mechanisms may be combined with one or more other ones of the mechanism in the effort to recover bandwidth efficiency that would otherwise be lost to idle slots.

Figure 3:
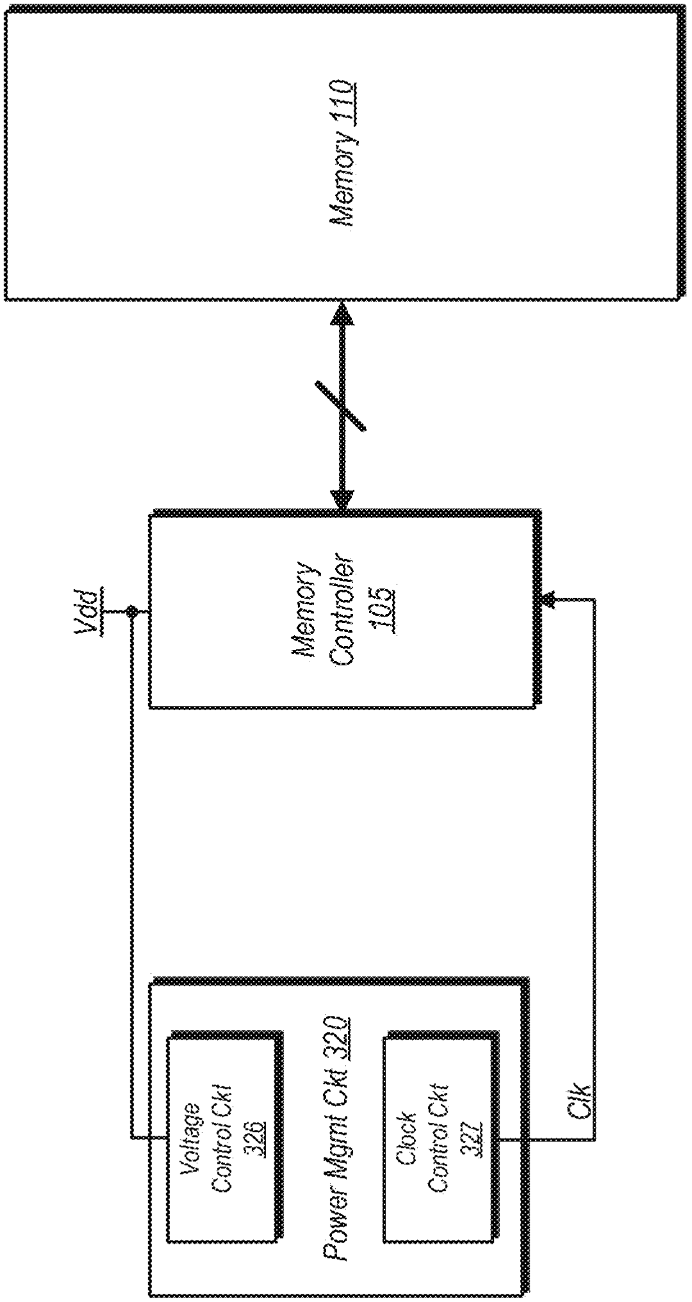
FIG. 3 is a block diagram illustrating one embodiment of a power management circuit as coupled to a memory subsystem.

Memory Subsystem with Power Management Circuit:

FIG. 3 is a block diagram illustrating one embodiment of a power management circuit as coupled to a memory subsystem. As discussed elsewhere herein, computing systems may be configured to operate in different ones of a number of different performance states in order to optimize performance vs. power consumption. Light computing workloads may operate at lower performance states, while heavy computing workloads may operate at higher performance states.

A given performance state is defined herein at least by a clock frequency, but may also include a supply voltage. Lower performance states may utilize a lower clock frequency and a lower supply voltage, while higher performance states may utilize a higher clock frequency and a higher supply voltage. Power management circuit 320 in the embodiment shown includes a voltage control circuit 326 and a clock control circuit 327. The voltage control circuit may, in one embodiment, be a multi-phase power converter or control circuit thereof, with phases added or shed to adjust the supply voltage, Vdd, when changing from one performance state to another. Clock control circuit 327 may include a source clock signal and other circuits, such as clock dividers or clock multipliers, to adjust the frequency of the clock signal, Clk.

Figure 4:
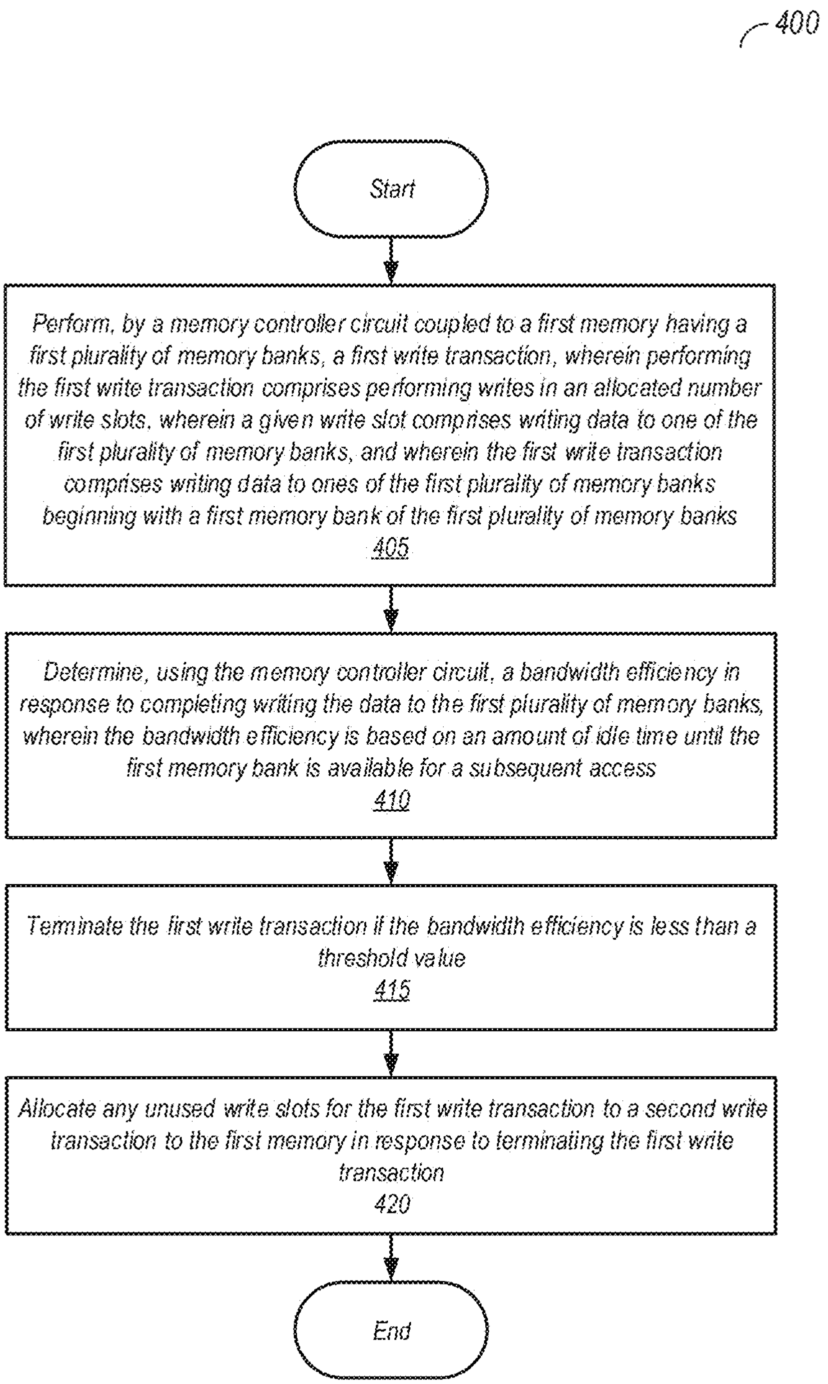
FIG. 4 is a flow diagram of one embodiment of a method for operating a memory subsystem.

Methods of Operation:

FIG. 4 is a flow diagram of one embodiment of a method for operating a memory subsystem. Method 400 may be carried out using various embodiments of a memory subsystem such as those discussed above. Furthermore, embodiments of a memory subsystem capable of carrying out Method 400, whether explicitly discussed in this discussed herein or not, are considered to fall within the scope of this disclosure.

Method 400 includes performing, by a memory controller circuit coupled to a first memory having a first plurality of memory banks, a first write transaction, wherein performing the first write transaction comprises performing writes in an allocated number of write slots, wherein a given write slot comprises writing data to one of the first plurality of memory banks, and wherein the first write transaction comprises writing data to ones of the first plurality of memory banks beginning with a first memory bank of the first plurality of memory banks (block 405). The method further includes determining, using the memory controller circuit, a bandwidth efficiency in response to completing writing the data to the first plurality of memory banks, wherein the bandwidth efficiency is based on an amount of idle time until the first memory bank is available for a subsequent access (block 410). The method continues with terminating the first write transaction if the bandwidth efficiency is less than a threshold value (block 415) and allocating any unused write slots for the first write transaction to a second write transaction to the first memory in response to terminating the first write transaction (block 420).

In various embodiments, the method includes determining a difference between a time to complete the allocated number of write slots, and the amount of idle time until the first memory bank is accessible again calculating a bandwidth efficiency by dividing the difference by the time to complete the allocated number of time slots. Some embodiments of the method may also include initiating a read transaction with the first memory in response to a termination of the first write transaction.

In response to determining that the bandwidth efficiency is greater than or equal to the threshold value after completing writing the data to the first plurality of memory banks, the method may further includes delaying the first write transaction until the first memory bank is accessible again, resuming the first write transaction upon the first memory bank becoming accessible again; and completing the first write transaction by using the allocated number of write slots.

Some embodiments of the method include activating, by the memory controller circuit, a second memory (which may also be referred to as a second memory rank) coupled to the memory controller circuit. Such embodiments may further include in response to terminating the first write transaction, initiating a subsequent write transaction to the second memory. These embodiments may also includes allocating the unused write slots for the first write transaction to the subsequent write transaction to the second memory and in response to terminating the first write transaction and determining that no write transaction is pending for the second memory, initiating a read transaction from the first memory.

Figure 5:
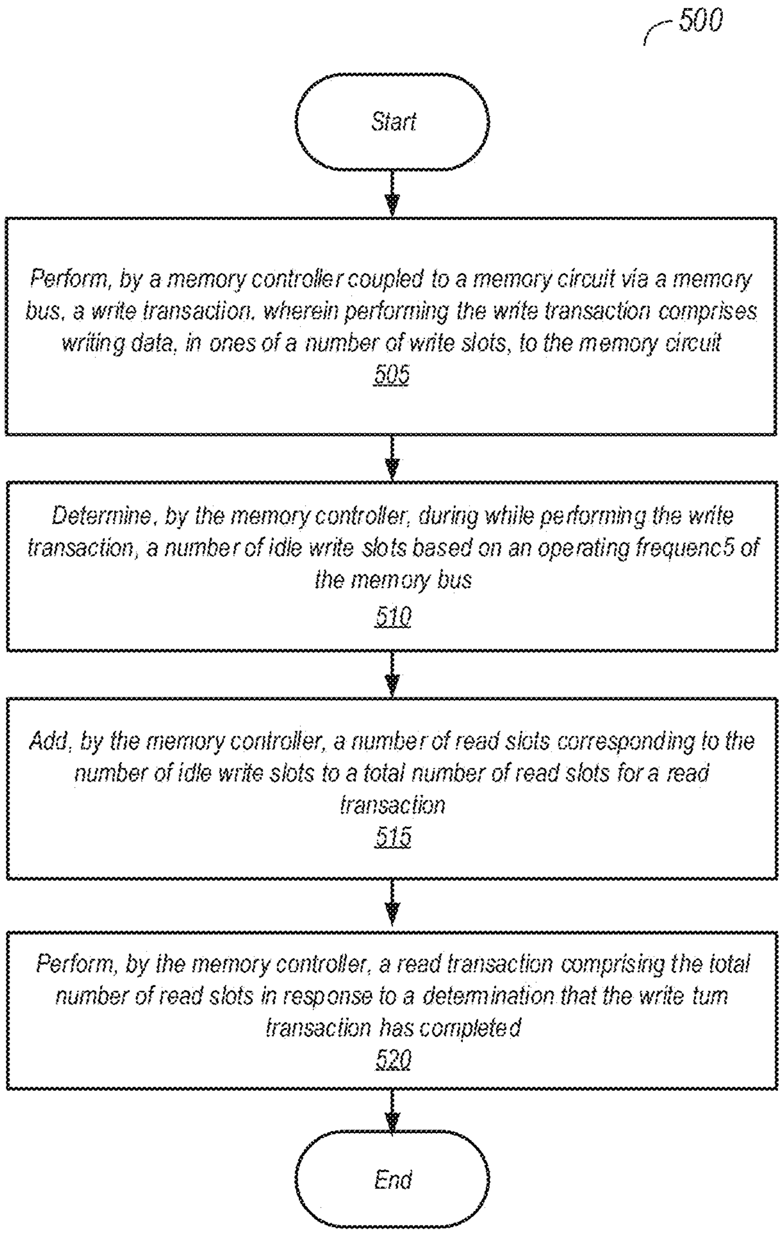
FIG. 5 is a flow diagram of another embodiment of a method for operating a memory subsystem.

FIG. 5 is a flow diagram of another embodiment of a method for operating a memory subsystem. Method 500 may be carried out using various embodiments of a memory subsystem such as those discussed above. Furthermore, embodiments of a memory subsystem capable of carrying out Method 500, whether explicitly discussed in this discussed herein or not, are considered to fall within the scope of this disclosure.

Method 500 includes performing, by a memory controller coupled to a memory circuit via a memory bus, a write transaction, wherein performing the write transaction comprises writing data, in ones of a number of write slots, to the memory circuit (block 505). The method further includes determining, by the memory controller, during while performing the write transaction, a number of idle write slots based on an operating frequency of the memory bus (block 510). Thereafter, the method continues by adding, by the memory controller, a number of read slots corresponding to the number of idle write slots to a total number of read slots for a read transaction (block 515) and performing, by the memory controller, a read transaction comprising the total number of read slots in response to a determination that the write turn transaction has completed (block 520).

In various embodiments, performing the write transaction comprises writing data, in a sequence, to ones of a plurality of memory banks of the memory, and wherein the number of idle slots is dependent on availability of a first one of the plurality of memory banks for an access subsequent to a write to the first one of the plurality of memory banks. In some embodiments, the number of read slots corresponding to the number of idle write slots is a first number at a first operating frequency and a second number at a second operating frequency, wherein the second operating frequency is greater than the first operating frequency, and wherein the second number is greater than the first number.

Embodiments of the method may further include operating the memory controller in ones of plurality of performance states having corresponding ones of a plurality of operating frequencies and storing, in a register of the memory controller, respective values indicating the number of idle write slots for corresponding ones of the plurality of performance states. In such embodiments, wherein the plurality of performance states may include a first subset of performance states and a second subset of performance states, wherein the number of idle slots for ones of the first subset of performance states is one or more, and wherein the number of idle slots for ones of the second subset of performance states is zero. Furthermore, in these embodiments, wherein respective operating frequencies for ones of the second subset of performance states may be less than operating frequencies for respective ones of the first subset of performance states. These embodiments of the method may also include arbitrating, using a read arbiter circuit of the memory controller, between a plurality of read requests, initiating the read transaction based on an arbitration between read requests, and adding the number of read slots to the total number of read slots based on a current one of the plurality of performance states in which the memory controller is operating.

In performing writes to the memory, the method may include writing, for ones of the number of write slots, a predetermined amount of data to a corresponding one of the plurality of memory banks.

Figure 6:
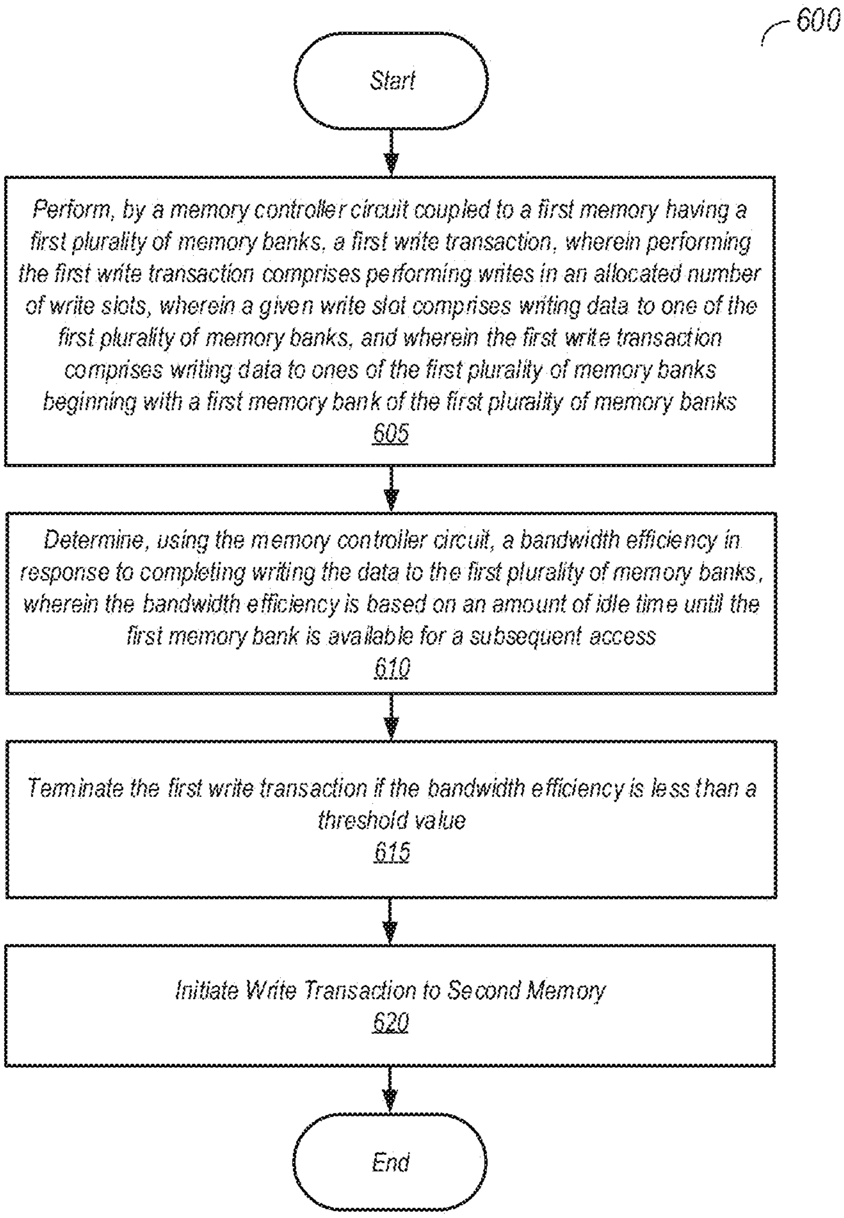
FIG. 6 is a flow diagram of another embodiment of a method for operating a memory subsystem.

FIG. 6 is a flow diagram of another embodiment of a method for operating a memory subsystem. Method 600 of FIG. 6 may be carried out by various embodiments of a dual-rank (or, more generally, multi-rank) memory subsystem, including that which is discussed above. Embodiments of a multi-rank memory subsystem capable of carrying out Method 600, but not explicitly discussed herein, are considered to fall within the scope of this disclosure.

Method 600 includes performing, by a memory controller circuit coupled to a first memory having a first plurality of memory banks, a first write transaction, wherein performing the first write transaction comprises performing writes in an allocated number of write slots, wherein a given write slot comprises writing data to one of the first plurality of memory banks, and wherein the first write transaction comprises writing data to ones of the first plurality of memory banks beginning with a first memory bank of the first plurality of memory banks (block 605). The method further includes determining, using the memory controller circuit, a bandwidth efficiency in response to completing writing the data to the first plurality of memory banks, wherein the bandwidth efficiency is based on an amount of idle time until the first memory bank is available for a subsequent access (block 610). The method also includes terminating the first write transaction if the bandwidth efficiency is less than a threshold value (block 615) and initiating a write transaction to the second memory (block 620).

Figure 7:
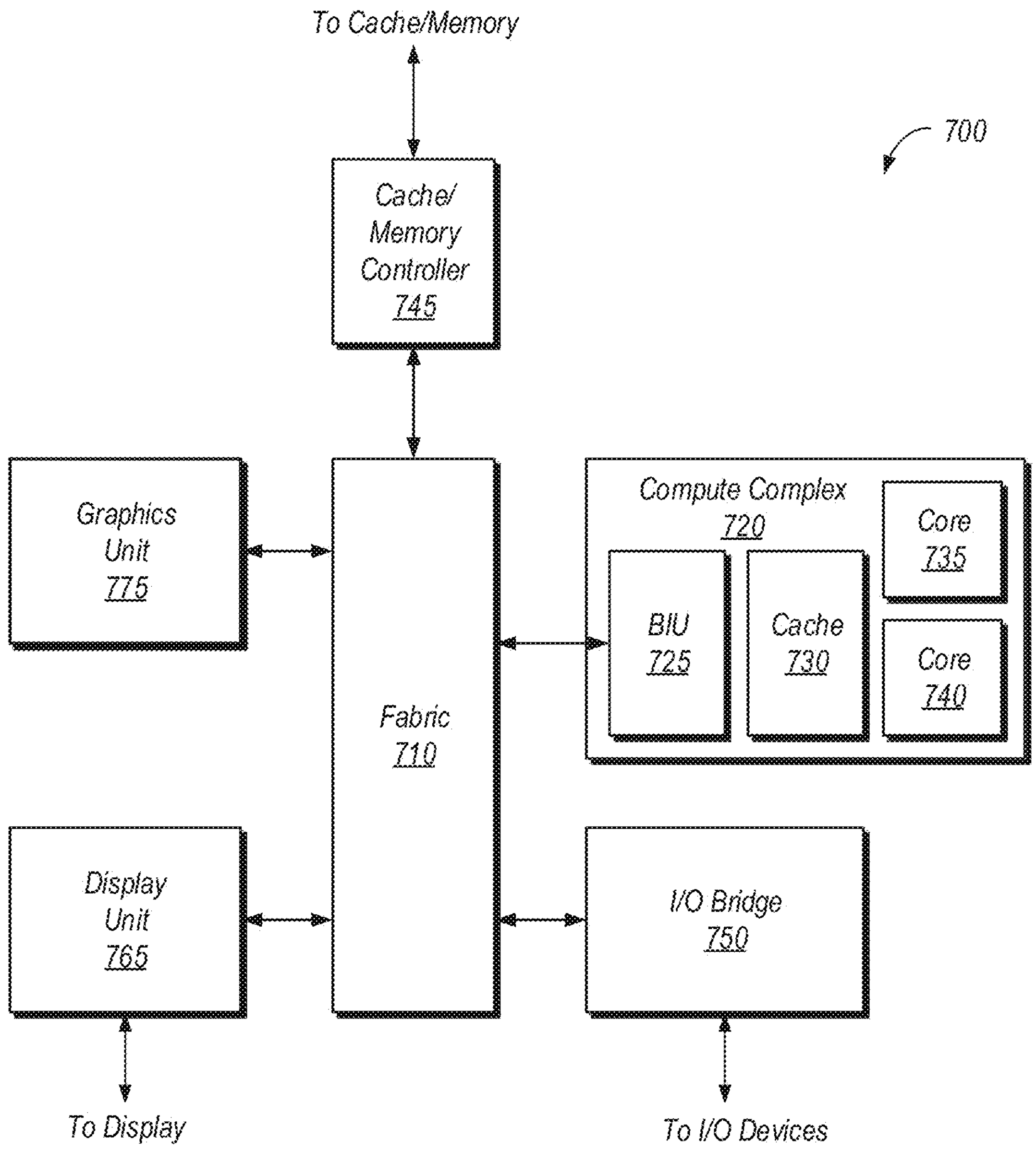
FIG. 7 is a block diagram of an embodiment of a device that includes a memory subsystem in accordance with the disclosure.

In various embodiments, in response to determining that no write transaction is pending for the second memory, the method further comprises initiating a read transaction to the first memory and allocating any unused write slots for the first write transaction to a second write Device, System, and Computer-Readable Medium:

Referring now to FIG. 7, a block diagram illustrating an example embodiment of a device that may include a memory subsystem in accordance with the disclosure. In some embodiments, elements of device 700 may be included within a system on a chip. In some embodiments, device 700 may be included in a mobile device, which may be battery-powered. Therefore, power consumption by device 700 may be an important design consideration. In the illustrated embodiment, device 700 includes fabric 710, compute complex 720, input/output (I/O) bridge 750, cache/memory controller 745, graphics unit 775, and display unit 765. In some embodiments, device 700 may include other components (not shown) in addition to, or in place of, the illustrated components, such as video processor encoders and decoders, image processing or recognition elements, computer vision elements, etc.

Fabric 710 may include various interconnects, buses, MUX's, controllers, etc., and may be configured to facilitate communication between various elements of device 700. In some embodiments, portions of fabric 710 may be configured to implement various different communication protocols. In other embodiments, fabric 710 may implement a single communication protocol, and elements coupled to fabric 710 may convert from the single communication protocol to other communication protocols internally.

In the illustrated embodiment, compute complex 720 includes bus interface unit (BIU) 725, cache 730, and cores 735 and 740. In various embodiments, compute complex 720 may include various numbers of processors, processor cores, and caches. For example, compute complex 720 may include 1, 2, or 4 processor cores, or any other suitable number. In one embodiment, cache 730 is a set associative L2 cache. In some embodiments, cores 735 and 740 may include internal instruction and data caches. In some embodiments, a coherency unit (not shown) in fabric 710, cache 730, or elsewhere in device 700, may be configured to maintain coherency between various caches of device 700. BIU 725 may be configured to manage communication between compute complex 720 and other elements of device 700. Processor cores, such as cores 735 and 740, may be configured to execute instructions of a particular instruction set architecture (ISA) which may include operating system instructions and user application instructions. These instructions may be stored in a computer readable medium such as a memory coupled to cache memory controller 745 as discussed below.

As used herein, the term "coupled to" may indicate one or more connections between elements, and a coupling may include intervening elements. For example, in FIG. 7, graphics unit 775 may be described as "coupled to" a memory through fabric 710 and cache/memory controller 745. In contrast, in the illustrated embodiment of FIG. 7, graphics unit 775 is "directly coupled" to fabric 710 because there are no intervening elements.

Cache/memory controller 745 may be configured to manage transfer of data between fabric 710 and one or more caches and memories. For example, cache/memory controller 745 may be coupled to an L3 cache, which may, in turn, be coupled to a system memory. In other embodiments, cache/memory controller 745 may be directly coupled to a memory. In some embodiments, cache/memory controller 745 may include one or more internal caches. Memory coupled to cache/memory controller 745 may be any type of volatile memory, such as dynamic random access memory (DRAM), synchronous DRAM (SDRAM), double data rate (DDR, DDR2, DDR3, etc.) SDRAM (including mobile versions of SDRAMs such as mDDR3, etc., and/or low power versions of SDRAMs such as LPDDR4, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with an integrated circuit in a chip-on-chip configuration, a package-on-package configuration, or a multi-chip module configuration. Memory coupled to cache/memory controller 745 may be any type of non-volatile memory such as NAND flash memory, NOR flash memory, nano RAM (NRAM), magneto-resistive RAM (MRAM), phase change RAM (PRAM), Racetrack memory, Memristor memory, etc. As noted above, this memory may store program instructions executable by compute complex 720 to cause the computing device to perform functionality described herein.

Graphics unit 775 may include one or more processors, e.g., one or more graphics processing units (GPUs). Graphics unit 775 may receive graphics-oriented instructions, such as OPENGL®, Metal®, or DIRECT3D® instructions, for example. Graphics unit 775 may execute specialized GPU instructions or perform other operations based on the received graphics-oriented instructions. Graphics unit 775 may generally be configured to process large blocks of data in parallel, and may build images in a frame buffer for output to a display, which may be included in the device or may be a separate device. Graphics unit 775 may include transform, lighting, triangle, and rendering engines in one or more graphics processing pipelines. Graphics unit 775 may output pixel information for display images. Graphics unit 775, in various embodiments, may include programmable shader circuitry which may include highly parallel execution cores configured to execute graphics programs, which may include pixel tasks, vertex tasks, and compute tasks (which may or may not be graphics-related).

Display unit 765 may be configured to read data from a frame buffer and provide a stream of pixel values for display. Display unit 765 may be configured as a display pipeline in some embodiments. Additionally, display unit 765 may be configured to blend multiple frames to produce an output frame. Further, display unit 765 may include one or more interfaces (e.g., MIPI® or embedded display port (eDP)) for coupling to a user display (e.g., a touchscreen or an external display).

I/O bridge 750 may include various elements configured to implement universal serial bus (USB) communications, security, audio, and low-power always-on functionality, for example. I/O bridge 750 may also include interfaces such as pulse-width modulation (PWM), general-purpose input/output (GPIO), serial peripheral interface (SPI), and inter-integrated circuit (I2C), for example. Various types of peripherals and devices may be coupled to device 700 via I/O bridge 750.

In some embodiments, device 700 includes network interface circuitry (not explicitly shown), which may be connected to fabric 710 or I/O bridge 750. The network interface circuitry may be configured to communicate via various networks, which may be wired, wireless, or both. For example, the network interface circuitry may be configured to communicate via a wired local area network, a wireless local area network (e.g., via Wi-Fi™), or a wide area network (e.g., the Internet or a virtual private network). In some embodiments, the network interface circuitry is configured to communicate via one or more cellular networks that use one or more radio access technologies. In some embodiments, the network interface circuitry is configured to communicate using device-to-device communications (e.g., Bluetooth® or Wi-Fi™ Direct), etc. In various embodiments, the network interface circuitry may provide device 700 with connectivity to various types of other devices and networks.

Figure 8:
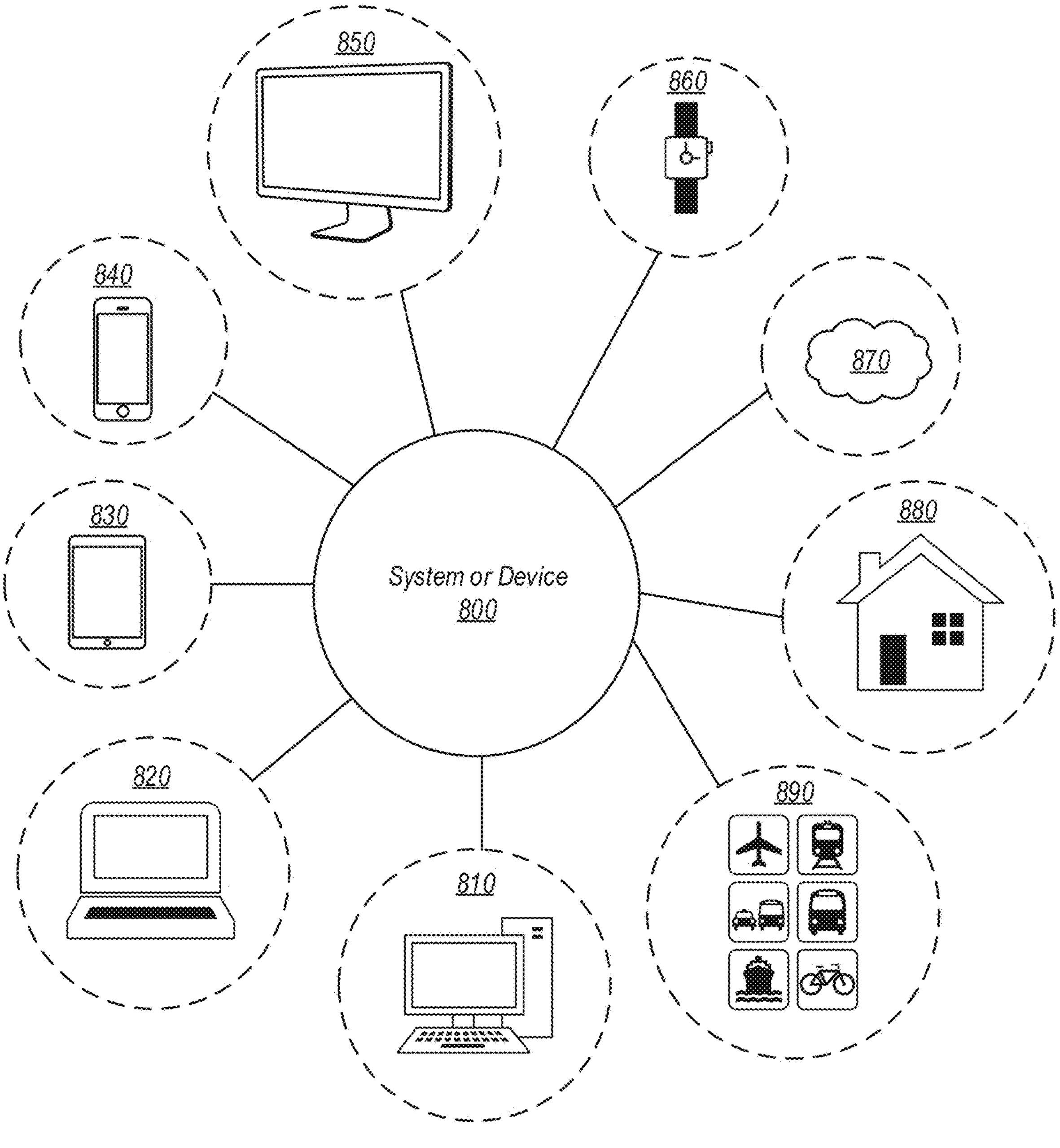
FIG. 8 is a block diagram of various embodiments of computer systems that may include a memory subsystem in accordance with the disclosure>.

Turning now to FIG. 8, various types of systems that may include any of the circuits, devices, or systems discussed above are illustrated. System or device 800, which may incorporate or otherwise utilize one or more of the techniques described herein, may be utilized in a wide range of areas. For example, system or device 800 may be utilized as part of the hardware of systems such as a desktop computer 810, laptop computer 820, tablet computer 830, cellular or mobile phone 840, or television 850 (or set-top box coupled to a television).

Similarly, disclosed elements may be utilized in a wearable device 860, such as a smartwatch or a health-monitoring device. Smartwatches, in many embodiments, may implement a variety of different functions—for example, access to email, cellular service, calendar, health monitoring, etc. A wearable device may also be designed solely to perform health-monitoring functions, such as monitoring a user's vital signs, performing epidemiological functions such as contact tracing, providing communication to an emergency medical service, etc. Other types of devices are also contemplated, including devices worn on the neck, devices implantable in the human body, glasses or a helmet designed to provide computer-generated reality experiences such as those based on augmented and/or virtual reality, etc.

System or device 800 may also be used in various other contexts. For example, system or device 800 may be utilized in the context of a server computer system, such as a dedicated server or on shared hardware that implements a cloud-based service 870. Still further, system or device 800 may be implemented in a wide range of specialized everyday devices, including devices 880 commonly found in the home such as refrigerators, thermostats, security cameras, etc. The interconnection of such devices is often referred to as the "Internet of Things" (IoT). Elements may also be implemented in various modes of transportation. For example, system or device 800 could be employed in the control systems, guidance systems, entertainment systems, etc. of various types of vehicles 890.

The applications illustrated in FIG. 8 are merely exemplary and are not intended to limit the potential future applications of disclosed systems or devices. Other example applications include, without limitation: portable gaming devices, music players, data storage devices, unmanned aerial vehicles, etc.

The present disclosure has described various example circuits in detail above. It is intended that the present disclosure cover not only embodiments that include such circuitry, but also a computer-readable storage medium that includes design information that specifies such circuitry. Accordingly, the present disclosure is intended to support claims that cover not only an apparatus that includes the disclosed circuitry, but also a storage medium that specifies the circuitry in a format that programs a computing system to generate a simulation model of the hardware circuit, programs a fabrication system configured to produce hardware (e.g., an integrated circuit) that includes the disclosed circuitry, etc. Claims to such a storage medium are intended to cover, for example, an entity that produces a circuit design, but does not itself perform complete operations such as design simulation, design synthesis, circuit fabrication, etc.

Figure 9:
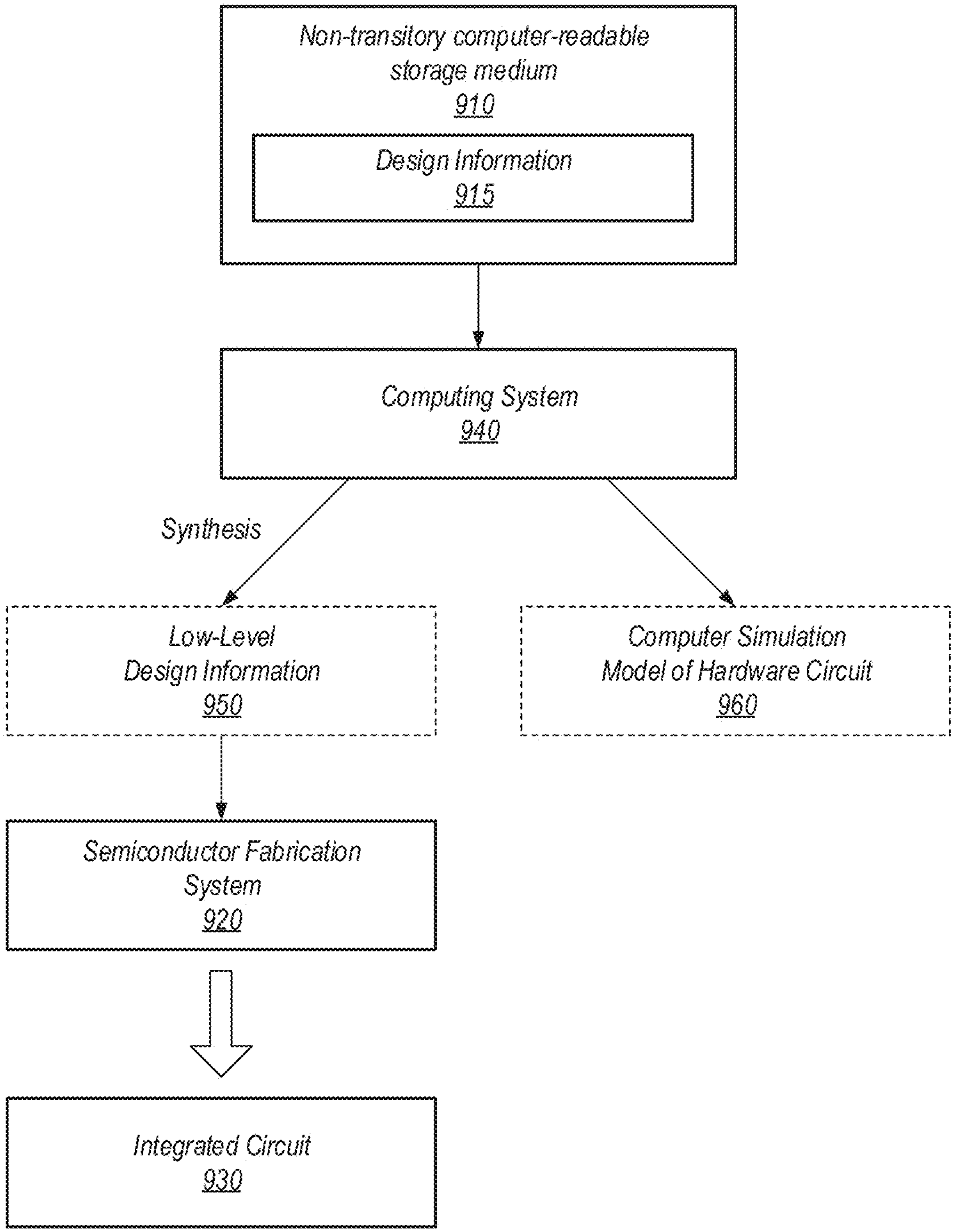
FIG. 9 illustrates an example of a non-transitory computer-readable storage medium that stores circuit design information.

FIG. 9 is a block diagram illustrating an example of a non-transitory computer-readable storage medium that stores design information 915, according to some embodiments. In the illustrated embodiment, computing system 940 is configured to process design information 915. This may include executing instructions included in design information 915, interpreting instructions included in design information 915, compiling, transforming, or otherwise updating design information 915, etc. Therefore, design information 915 controls computing system 940 (e.g., by programming computing system 940) to perform various operations discussed below, in some embodiments.

In the illustrated example, computing system 940 processes design information 915 to generate both computer simulation model of hardware circuit 960 and low-level design information 950. In other embodiments, computing system 940 may generate only one of these outputs, may generate other outputs based on design information 915, or both. Regarding computer simulation model of hardware circuit 960, computing system 940 may execute instructions of a hardware description language that includes register transfer level (RTL) code, behavioral code, structural code, or some combination thereof. The simulation model may perform the functionality specified by design information 915, facilitate verification of the functional correctness of the hardware design, generate power consumption estimates, generate timing estimates, etc.

In the illustrated example, computing system 940 also processes design information 915 to generate low-level design information 950 (e.g., gate-level design information, a netlist, etc.). This may include synthesis operations, as shown, such as constructing a multi-level network, optimizing the network using technology-independent techniques, technology dependent techniques, or both, and outputting a network of gates (with potential constraints based on available gates in a technology library, sizing, delay, power, etc.). Based on low-level design information 950 (potentially among other inputs), semiconductor fabrication system 920 is configured to fabricate integrated circuit 930 (which may correspond to functionality of the computer simulation model of hardware circuit 960). Note that computing system 940 may generate different simulation models based on design information at various levels of description, including low-level design information 950, design information 915, and so on. The data representing low-level design information 950 and computer simulation model of hardware circuit 960 may be stored on non-transitory computer-readable storage medium 910, or on one or more other media.

In some embodiments, low-level design information 950 controls (e.g., programs) semiconductor fabrication system 920 to fabricate integrated circuit 930. Thus, when processed by the fabrication system, the design information may program the fabrication system to fabricate a circuit that includes various circuitry disclosed herein.

Non-transitory computer-readable storage medium 910 may comprise any of various appropriate types of memory devices or storage devices. Non-transitory computer-readable storage medium 910 may be an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash memory, magnetic media, e.g., a hard drive, or optical storage; registers, or other similar types of memory elements, etc. Non-transitory computer-readable storage medium 910 may include other types of non-transitory memory as well, or combinations thereof. Accordingly, non-transitory computer-readable storage medium 910 may include two or more memory media, which may reside in different locations for example, in different computer systems that are connected over a network.

Design information 915 may be specified using any of various appropriate computer languages, including hardware description languages such as, without limitation: VHDL, Verilog, SystemC, System Verilog, RHDL, M, MyHDL, etc. The format of various design information may be recognized by one or more applications executed by computing system 940, semiconductor fabrication system 920, or both. In some embodiments, design information 915 may also include one or more cell libraries that specify the synthesis, layout, or both of integrated circuit 930. In some embodiments, design information 915 is specified in whole, or in part, in the form of a netlist that specifies cell library elements and their connectivity. Design information discussed herein, taken alone, may or may not include sufficient information for fabrication of a corresponding integrated circuit. For example, design information may specify the circuit elements to be fabricated but not their physical layout. In this case, design information may be combined with layout information to actually fabricate the specified circuitry.

Integrated circuit 930 may, in various embodiments, include one or more custom macrocells, such as memories, analog or mixed-signal circuits, and the like. In such cases, design information 915 may include information related to included macrocells. Such information may include, without limitation, schematics capture database, mask design data, behavioral models, and device or transistor level netlists. Mask design data may be formatted according to graphic data system (GDSII), or any other suitable format.

Semiconductor fabrication system 920 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 920 may also be configured to perform various testing of fabricated circuits for correct operation.

In various embodiments, integrated circuit 930 and computer simulation model of hardware circuit 960 are configured to operate according to a circuit design specified by design information 915, which may include performing any of the functionality described herein. For example, integrated circuit 930 may include any of various elements shown in FIGS. 1-7. Further, integrated circuit 930 may be configured to perform various functions described herein in conjunction with other components. Further, the functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components. Similarly, stating "instructions of a hardware description programming language" that are "executable" to program a computing system to generate a computer simulation model does not imply that the instructions must be executed in order for the element to be met, but rather, specifies characteristics of the instructions. Additional features relating to the model (or the circuit represented by the model) may similarly relate to characteristics of the instructions, in this context. Therefore, an entity that sells a computer-readable medium with instructions that satisfy recited characteristics may provide an infringing product, even if another entity actually executes the instructions on the medium.

Note that a given design, at least in the digital logic context, may be implemented using a multitude of different gate arrangements, circuit technologies, etc. As one example, different designs may select or connect gates based on design tradeoffs (e.g., to focus on power consumption, performance, circuit area, etc.). Further, different manufacturers may have proprietary libraries, gate designs, physical gate implementations, etc. Different entities may also use different tools to process design information at various layers (e.g., from behavioral specifications to physical layout of gates).

Once a digital logic design is specified, however, those skilled in the art need not perform substantial experimentation or research to determine those implementations. Rather, those of skill in the art understand procedures to reliably and predictably produce one or more circuit implementations that provide the function described by design information 915. The different circuit implementations may affect the performance, area, power consumption, etc. of a given design (potentially with tradeoffs between different design goals), but the logical function does not vary among the different circuit implementations of the same circuit design.

In some embodiments, the instructions included in design information 915 provide RTL information (or other higher-level design information) and are executable by the computing system to synthesize a gate-level netlist that represents the hardware circuit based on the RTL information as an input. Similarly, the instructions may provide behavioral information and be executable by the computing system to synthesize a netlist or other lower-level design information included in low-level design information 950. Low-level design information 950 may program semiconductor fabrication system 920 to fabricate integrated circuit 930.

The present disclosure includes references to an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more of the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent claims that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third," when applied to a feature, do not imply any type of ordering (e.g., spatial, temporal, logical, etc.), unless stated otherwise.

The phrase "based on" is used to describe one or more factors that affect a determination. This term does not foreclose the possibility that additional factors may affect the determination. That is, a determination may be solely based on specified factors, or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, a circuit, or a system having a processor unit and a memory storing program instructions executable to implement the task, etc. This phrase is not used herein to refer to something intangible.

In some cases, various units/circuits/components may be described herein as performing a set of tasks or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), a functional unit, a memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements may be defined by the functions or operations that they are configured to implement. The arrangement of such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as a structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used to transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits, or portions thereof, may also be custom-designed in a schematic editor and captured into the integrated circuit design along with synthesized circuitry. The integrated circuits may include transistors and other circuit elements (e.g., passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

What is claimed is:

1. An apparatus, comprising:

a memory circuit including a plurality of memory banks; and a memory controller circuit coupled to the memory circuit via a memory bus, wherein the memory controller circuit is configured to:

perform a write transaction that includes writing data to the memory circuit during corresponding ones of a plurality of write slots;

determine, while performing the write transaction and based on an operating frequency of the memory bus, a number of idle write slots, of the plurality of write slots, during which data is not written to the memory circuit;

increment, by a number of read slots corresponding to the number of idle write slots, a total number of read slots for a read transaction; and perform, in response to a determination that the write transaction has completed, a read transaction that includes reading data from the memory circuit during the total number of read slots.

2. The apparatus of claim 1, wherein, in performing the write transaction, the memory controller circuit is configured to write data, in a sequence, to ones of the plurality of memory banks, and wherein the number of idle slots is dependent on availability of a first one of the plurality of memory banks for an access subsequent to a write to the first one of the plurality of memory banks.

3. The apparatus of claim 1, wherein the number of read slots corresponding to the number of idle write slots is a first number at a first operating frequency and a second number at a second operating frequency, wherein the second operating frequency is greater than the first operating frequency, and wherein the second number is greater than the first number.

4. The apparatus of claim 1, wherein the memory controller circuit is further configured to operate in a plurality of performance states having corresponding ones of a plurality of operating frequencies, and wherein the memory controller circuit includes a register configured to store respective values indicating the number of idle write slots for corresponding ones of the plurality of performance states.

5. The apparatus of claim 4, wherein the plurality of performance states includes a first subset of performance states and a second subset of performance states, wherein the number of idle slots for ones of the first subset of performance states is one or more, and wherein the number of idle slots for ones of the second subset of performance states is zero.

6. The apparatus of claim 5, wherein respective operating frequencies for ones of the second subset of performance states are less than operating frequencies for respective ones of the first subset of performance states.

7. The apparatus of claim 4, further comprising a read arbiter circuit configured to:

initiate the read transaction based on an arbitration between read requests; and add the number of read slots to the total number of read slots based on a current one of the plurality of performance states in which the memory controller circuit is operating.

8. The apparatus of claim 1, wherein the memory controller circuit is further configured, for ones of the number of write slots, to write a predetermined amount of data to a corresponding one of the plurality of memory banks.

9. A method comprising:

performing, by a memory controller coupled to a memory circuit via a memory bus, a write transaction, wherein performing the write transaction comprises writing data, in ones of a number of write slots, to the memory circuit;

determining, by the memory controller, during while performing the write transaction, a number of idle write slots based on an operating frequency of the memory bus;

incrementing, using the memory controller and by a number of read slots corresponding to the number of idle write slots, a total number of read slots for a read transaction; and performing, by the memory controller, a read transaction comprising the total number of read slots in response to a determination that the write turn transaction has completed.

10. The method of claim 9, wherein performing the write transaction comprises writing data, in a sequence, to ones of a plurality of memory banks of the memory, and wherein the number of idle slots is dependent on availability of a first one of the plurality of memory banks for an access subsequent to a write to the first one of the plurality of memory banks.

11. The method of claim 9, wherein the number of read slots corresponding to the number of idle write slots is a first number at a first operating frequency and a second number at a second operating frequency, wherein the second operating frequency is greater than the first operating frequency, and wherein the second number is greater than the first number.

12. The method of claim 9, further comprising:

operating the memory controller in ones of plurality of performance states having corresponding ones of a plurality of operating frequencies; and storing, in a register of the memory controller, respective values indicating the number of idle write slots for corresponding ones of the plurality of performance states.

13. The method of claim 12, wherein the plurality of performance states includes a first subset of performance states and a second subset of performance states, wherein the number of idle slots for ones of the first subset of performance states is one or more, and wherein the number of idle slots for ones of the second subset of performance states is zero.

14. The method of claim 13, wherein respective operating frequencies for ones of the second subset of performance states are less than operating frequencies for respective ones of the first subset of performance states.

15. The method of claim 12, further comprising:

arbitrating, using a read arbiter circuit of the memory controller, between a plurality of read requests;

initiating the read transaction based on an arbitration between read requests; and adding the number of read slots to the total number of read slots based on a current one of the plurality of performance states in which the memory controller is operating.

16. The method of claim 9, further comprising writing, for ones of the number of write slots, a predetermined amount of data to a corresponding one of the plurality of memory banks.

17. A system comprising:

a memory circuit including a plurality of memory banks; and a memory controller circuit coupled to the memory circuit via a memory bus, wherein the memory controller circuit is configured to operate in ones of a plurality of performance states, wherein each of the plurality of performance states includes a unique operating frequency with respect to other ones of the plurality of performance states, wherein the plurality of performance states includes a first subset of performance states and a second subset of performance states, and wherein the memory controller circuit is configured to, for ones of the first subset of performance states:

perform a write transaction that includes writing data to the memory circuit during corresponding ones of a plurality of write slots;

determine, while performing the write transaction and based on an operating frequency of the memory bus, a number of idle write slots of the plurality of write slot during which data is not written to the memory circuit;

increment, by a number of read slots corresponding to the number of idle write slots, a total number of read slots for a read transaction; and perform, in response to a determination that the write transaction has completed, a read transaction that includes reading data from the memory circuit during the total number of read slots.

18. The system of claim 17, further comprising a power management circuit configured to determine in which of the plurality of performance states the memory controller circuit is to operate at a given instant.

19. The system of claim 17, wherein the number of idle slots for ones of the first subset of performance states is one or more, and wherein the number of idle slots for ones of the second subset of performance states is zero.

20. The system of claim 17, wherein respective operating frequencies for ones of the second subset of performance states are less than operating frequencies for respective ones of the first subset of performance states.

* * * * *